April 3, 1934.  J. G. KUHN  1,953,861
HEAD FOR PACKING APPARATUS
Filed Oct. 10, 1932
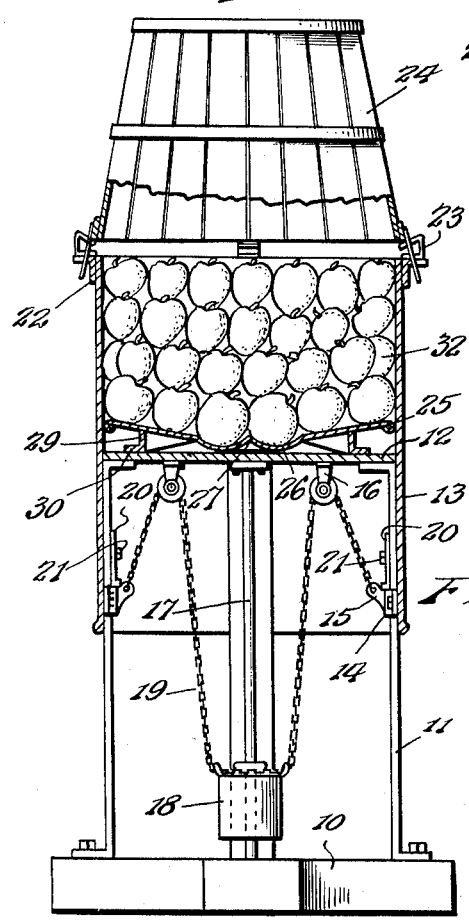
Inventor
J. G. Kuhn.
By Lacey & Lacey,
Attorneys Patented Apr. 3, 1934

1,953,861

UNITED STATES PATENT OFFICE 1,953,861

HEAD FOR PACKING APPARATUS

John G. Kuhn, Sewell, N. J.

Application October 10, 1932, Serial No. 637,136

2 Claims. (Cl. 226—17)

This invention relates to an improved head for face packing fruits, vegetables or other similar commodities, being particularly designed for use in connection with improved apparatus shown in my pending application for Means for packing fruit and vegetables, filed May 19, 1932, Serial No. 612,351.

The invention seeks, among other objects, to provide a device which may be readily placed within the measuring cylinder of the apparatus mentioned to receive a layer of fruit or vegetables, as the case may be, and on which the fruit or vegetables may be neatly arranged so that when a basket is filled with the commodity, such layer of fruit or vegetables will present a neat and orderly appearance at the top of the basket.

The invention seeks, as a further object, to provide a device embodying a circular face plate provided centrally with a circular channel, the diameter of which will determine the size of the fruit which may be neatly accommodated in said channel as well as the size of the fruit that may be neatly accommodated between the channel and the periphery of the plate whereby a plate with a given size of channel will determine the number of circular rows of fruit which may be neatly arranged on the plate as well as the size of the fruit of each row to provide a face layer of fruit of uniform size at the top of a filled basket.

And the invention seeks, as a still further object, to provide a device which will be strong and durable and which will be provided with means which may be readily grasped for lifting and righting an inverted filled basket.

Other and incidental objects of the invention, not specifically mentioned in the foregoing, will be apparent during the course of the following description.

In the accompanying drawing forming a part of this application,

Figure 1 is a vertical sectional view showing my improved device in position in a packing apparatus of the character disclosed in my prior application previously identified, Fig. 2 is a view, partly in elevation and partly in section, showing the device at the top of a filled basket of fruit, Fig. 3 is a plan view particularly showing the face plate of the device, and Fig. 4 is a bottom plan view of the device.

Referring now more particularly to the drawing, I have shown the present invention in connection with an apparatus for packing fruit and vegetables as disclosed in my pending application. This apparatus includes a base 10 from which rise legs or standards 11. Fixed to the upper ends of said standards is a circular platform 12. Slidably surrounding the platform is a cylinder or measuring vessel 13 to the lower end portion of which are attached, at its inner side, a pair of guides 14 slidably accommodating a pair of legs 11, the guides being equipped with brackets 15. Attached to the platform 12, at its lower side, is a pair of pulleys 16 and depending from said platform, axially thereof, is a guide rod 17 anchored at its lower end to the base 10. Slidable on said rod is a counterweight 18 and attached to said counterweight are chains 19 which are trained about the pulleys 16 and connected at their ends to the brackets 15. Thus, as will be perceived, the counterweight will normally hold the cylinder 13 in an elevated position and will return said cylinder to such position after the cylinder has been depressed. The pair of legs 11 which accommodate the guides 14 also carry a pair of stops 20 to coact with the guides for limiting the cylinder in its upward travel and these stops are adjustable by means of bolts 21 for varying the effective capacity of the cylinder. Surrounding the upper end of the cylinder 13 is an angle bar 22, and fixed to said bar is a suitable number of posts 23, the free terminals of which are inclined downwardly and inwardly for centering and supporting a basket, as conventionally illustrated at 24, over the upper end of the cylinder, the lateral flange of the angle bar 22 being, as shown, provided with notches to freely accommodate the handles of the basket.

Coming now more particularly to the subject of the present invention, I employ a circular face plate 25 which may be formed of suitable sheet metal and is slightly conical in general contour. If desired, this plate may be rolled at its outer margin to present a smooth edge and may be equipped with a reinforcing wire within the bead defined by the rolled portion of the plate. Centrally, the plate is formed with an annular channel 26 and axially of said channel is pressed up to provide a conical peak 27 disposed axially of the plate. As will be observed, the bottom wall of the channel 26 is concavo-convex in cross section and said channel is arranged concentrically of the plate to provide a smooth sloping band or area 28 between the outer periphery of the channel and the periphery of the plate.

Spot welded or otherwise secured to the plate at its lower side is a concentrically arranged base ring 29 of less diameter than the plate. This ring is preferably formed of a suitable angle bar and the horizontally disposed flange 30 thereof thus provides a handle band which, when the device is inverted, may be readily grasped. Fixed at their wider outer ends to the vertical flange of the base ring 29 are triangular shaped brace members 31, the inner ends of which terminate at the periphery of the channel 26. These members, like the plate 25, may also be formed of suitable sheet metal and are spot welded or otherwise secured to said plate. As seen in Fig. 4, four of the brace members are preferably employed, but, of course, this detail may be varied if so desired.

As shown in Fig. 1, the device is of a size to be freely received within the cylinder 13 of the packing apparatus, supported by the base ring 29 upon the platform 12 and, in this connection, it is to be noted that said base ring is of a height to sustain the bottom wall of the channel 26 out of contact with said platform. Fruit or the like, as indicated at 32, is then carefully arranged in an initial layer upon the face plate, when the remainder of the fruit may be more or less carelessly disposed in place to fill the upper portion of the cylinder. The cylinder, with the basket 24 thereon, is then depressed to dispose the fruit within the basket after which the margin of the face plate is grasped for lifting the basket with the fruit therein from the platform 12. The basket may then, of course, be righted, as shown in Fig. 2, when the device is removed so that the layer of fruit which was initially arranged upon the face plate will be disposed at the top of the basket to present a neat and attractive appearance.

Particular attention is now directed to Fig. 3 of the drawing. As previously stated, the face plate 25 is preferably provided centrally with a single channel 26 only and assuming that it is desired to pack apples, for instance, of a two and three-quarter inch size, a device will be chosen having a face plate provided with a channel two and three-quarter inches across or a maximum five and one-half inch diameter. Thus, by selecting only such apples as will nicely fit in the channel, apples of the proper desired size will be assorted and, in the instance given, the smooth band 28 of the plate 25 will be of a width to accommodate two additional circular rows of apples of the same size as determined by the diameter of the channel 26. Thus, the plate will accommodate, in all, only three circular rows of apples of predetermined size, as gauged by the channel 26, so that all of the apples of the initial layer at the top of the basket will be of uniform size. In arranging the fruit upon the face plate 25, the channel 26 is first filled with a circular row of the fruit when the other rows of fruit are arranged in succession around the initial row. It has been found that this provides a very convenient way of placing the fruit upon the face plate and materially facilitates the quick packing of the fruit.

Having thus described the invention, I claim:

1. A head for packing apparatus including a conical face plate provided centrally with a gauge channel and formed with a smooth surface extending from said channel to the periphery of the plate, said surface being of a width approximately twice the major diameter of said channel.

2. A head for packing apparatus including a conical face plate provided centrally with a gauge channel, a base ring angle shaped in cross section fixed to the lower side of said plate, and brace members extending between said ring and the plate and terminating at the periphery of said channel.

JOHN G. KUHN. [L. S.]